US008930181B2

(12) United States Patent
Parikh

(10) Patent No.: US 8,930,181 B2
(45) Date of Patent: Jan. 6, 2015

(54) AUTOMATIC DYNAMIC CONTEXTUAL DATA ENTRY COMPLETION

(71) Applicant: Prashant Parikh, New York, NY (US)

(72) Inventor: Prashant Parikh, New York, NY (US)

( * ) Notice: Subject to any disclaimer, the term of this patent is extended or adjusted under 35 U.S.C. 154(b) by 256 days.

(21) Appl. No.: 13/706,666

(22) Filed: Dec. 6, 2012

(65) Prior Publication Data

US 2014/0163953 A1     Jun. 12, 2014

(51) Int. Cl.
*G06F 17/27* (2006.01)

(52) U.S. Cl.
USPC ............................... 704/9; 704/257; 704/255

(58) Field of Classification Search
USPC ............... 704/1–10, 251, 255, 257, 252, 254, 704/270; 715/261; 707/767
See application file for complete search history.

(56) References Cited

U.S. PATENT DOCUMENTS

| | | | |
|---|---|---|---|
| 5,680,511 A | 10/1997 | Baker et al. |
| 5,805,911 A | 9/1998 | Miller |
| 5,845,300 A | 12/1998 | Comer et al. |
| 5,896,321 A | 4/1999 | Miller et al. |
| 6,377,965 B1 | 4/2002 | Hachamovitch et al. |
| 6,529,187 B1 | 3/2003 | Dickelman |
| 6,564,213 B1 | 5/2003 | Ortega et al. |
| 6,751,603 B1 | 6/2004 | Bauer et al. |
| 6,801,190 B1 | 10/2004 | Robinson et al. |
| 6,810,272 B2 | 10/2004 | Kraft et al. |
| 6,820,075 B2 | 11/2004 | Shanahan et al. |
| 6,829,607 B1 | 12/2004 | Tafoya et al. |
| 6,886,010 B2 | 4/2005 | Kostoff |
| 6,947,930 B2 | 9/2005 | Anick et al. |
| 7,039,631 B1 | 5/2006 | Finger, II |
| 7,043,700 B1 | 5/2006 | Bertram et al. |
| 7,103,534 B2 | 9/2006 | Goodman |
| 7,111,248 B2 | 9/2006 | Mulvey et al. |
| 7,139,756 B2 | 11/2006 | Cooper |
| 7,149,695 B1 | 12/2006 | Bellegarda |
| 7,185,271 B2 | 2/2007 | Lee et al. |
| 7,218,249 B2 | 5/2007 | Chadha |
| 7,257,567 B2 | 8/2007 | Toshima |
| 7,266,554 B2 | 9/2007 | Kayahara et al. |
| 7,386,438 B1 | 6/2008 | Franz et al. |
| 7,392,175 B2 | 6/2008 | Kawatani |
| 7,610,194 B2 | 10/2009 | Bradford et al. |
| 7,630,980 B2 | 12/2009 | Parikh |
| 7,644,102 B2 | 1/2010 | Gaussier et al. |
| 7,650,348 B2 | 1/2010 | Lowles et al. |
| 7,657,423 B1 | 2/2010 | Harik et al. |
| 7,679,534 B2 | 3/2010 | Kay et al. |
| 7,698,326 B2 | 4/2010 | Thorn |
| 7,991,784 B2 | 8/2011 | Parikh |
| 8,036,878 B2 | 10/2011 | Assadollahi |
| 8,140,560 B2 | 3/2012 | Dinn |
| 8,200,865 B2 | 6/2012 | Gutowitz |
| 8,204,879 B2 | 6/2012 | Doyle |

(Continued)

OTHER PUBLICATIONS

MIT's Magazine of Innovation Technology Review, pp. 4, 5 & 27 (Nov. 2004).

(Continued)

*Primary Examiner* — Huyen X. Vo
(74) *Attorney, Agent, or Firm* — Weitzman Law Offices, LLC

(57) ABSTRACT

A method preformed in a character entry system involves receiving user input and using a Generalized Lexicographic Ordering (GLO) process to determine an order for presentation of one or more completion candidates to a the user for selection.

18 Claims, 9 Drawing Sheets

(56) References Cited

U.S. PATENT DOCUMENTS

| | | |
|---|---|---|
| 8,311,805 B2 | 11/2012 | Parikh |
| 8,417,718 B1* | 4/2013 | Finkelstein et al. .......... 707/767 |
| 2004/0093557 A1 | 5/2004 | Kawatani |
| 2004/0153963 A1 | 8/2004 | Simpson et al. |
| 2005/0060448 A1 | 3/2005 | Gutowitz |
| 2011/0154193 A1* | 6/2011 | Creutz et al. .................. 715/261 |
| 2012/0029910 A1* | 2/2012 | Medlock et al. ................. 704/9 |
| 2012/0296627 A1* | 11/2012 | Suzuki et al. ..................... 704/2 |
| 2013/0253908 A1* | 9/2013 | Zhai et al. ........................ 704/9 |

OTHER PUBLICATIONS

Matiasek et al., "Exploiting Long Distance Collocational Relations in Predictive Typing", Proc. pf EACL-03 Workshop on Language Modeling for Text Entry Methods (2003).

Witten et al., "The Zero-Frequency Problem: Estimating the Probabilities of Novel Events in Adaptive Text Compression", IEEE Trans. on Info. Theory, vol. 37, No. 4, pp. 1085-1094 (1991).

"A New Dictionary of Kanji Usage", Gakken Co., Ltd., pp. 433-435 (1982).

* cited by examiner

FIG. 3

Matrix 300

| | Apple | Cider | Orange | Paper |
|---|---|---|---|---|
| d1 | 2 | 1 | 1 | 0 |
| d2 | 1 | 0 | 0 | 1 |

FIG. 5

Matrix 500

| | Finance | Summary | Sugar | Two | One | Chapter | Chili | Spoon |
|---|---|---|---|---|---|---|---|---|
| Finance | | 12 | 1 | 2 | 3 | 5 | 0 | 0 |
| Summary | | | 0 | 3 | 6 | 10 | 0 | 0 |
| Sugar | | | | 7 | 9 | 0 | 3 | 14 |
| Two | | | | | 3 | 5 | 8 | 11 |
| One | | | | | | 6 | 8 | 19 |
| Chapter | | | | | | | 0 | 0 |
| Chili | | | | | | | | 2 |
| Spoon | | | | | | | | |

FIG. 6

Matrix 600

| Word List #1 | finance, report, summary, ... |
|---|---|
| Word List #2 | chili, one, salt, spoon, sugar, two, three, ... |
| Word List #3 | book, chapter, summary, two, three, ... |
| Word List #4 | apple, cider, orange, ... |
| Word List #5 | orange, paper, ... |

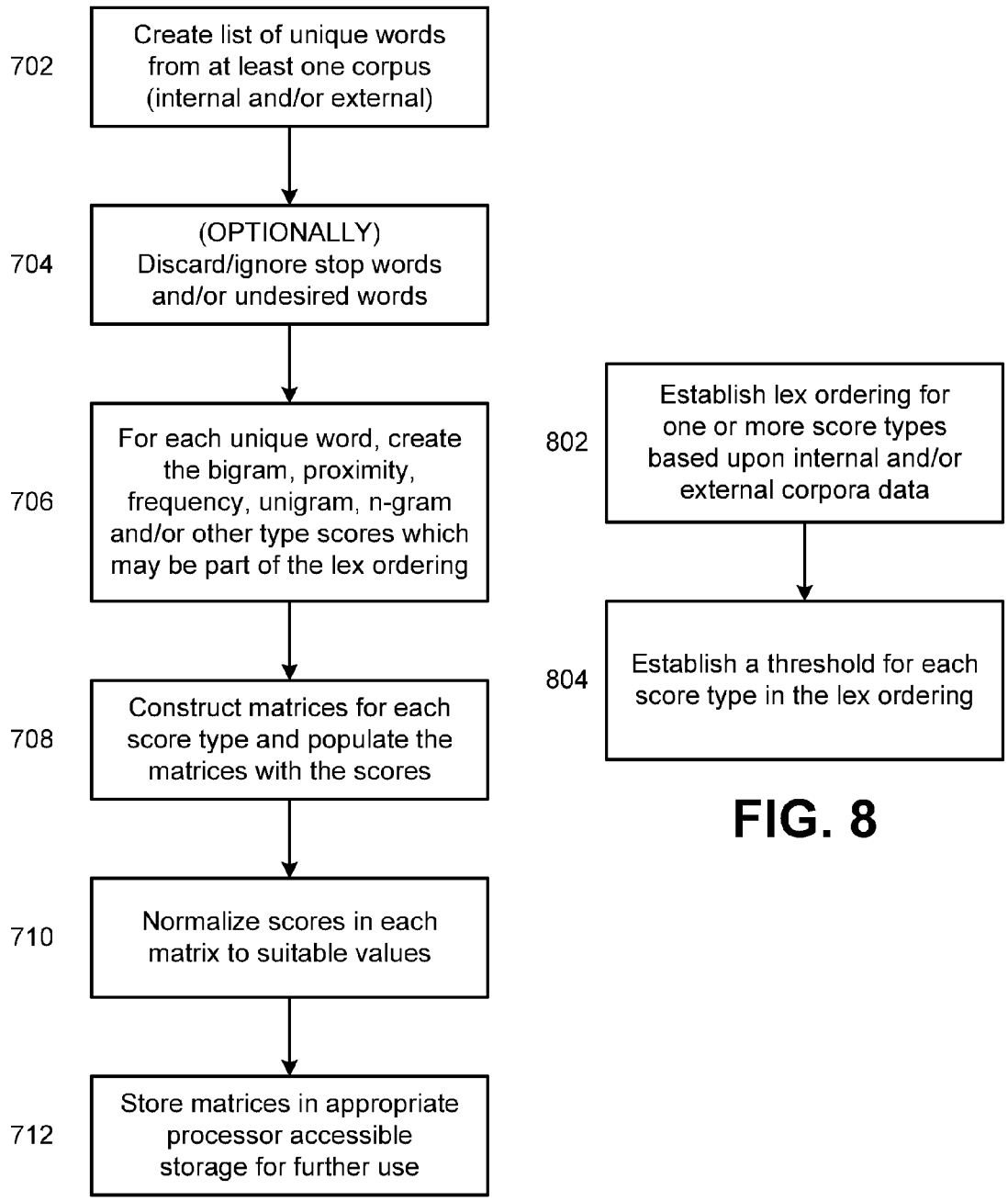

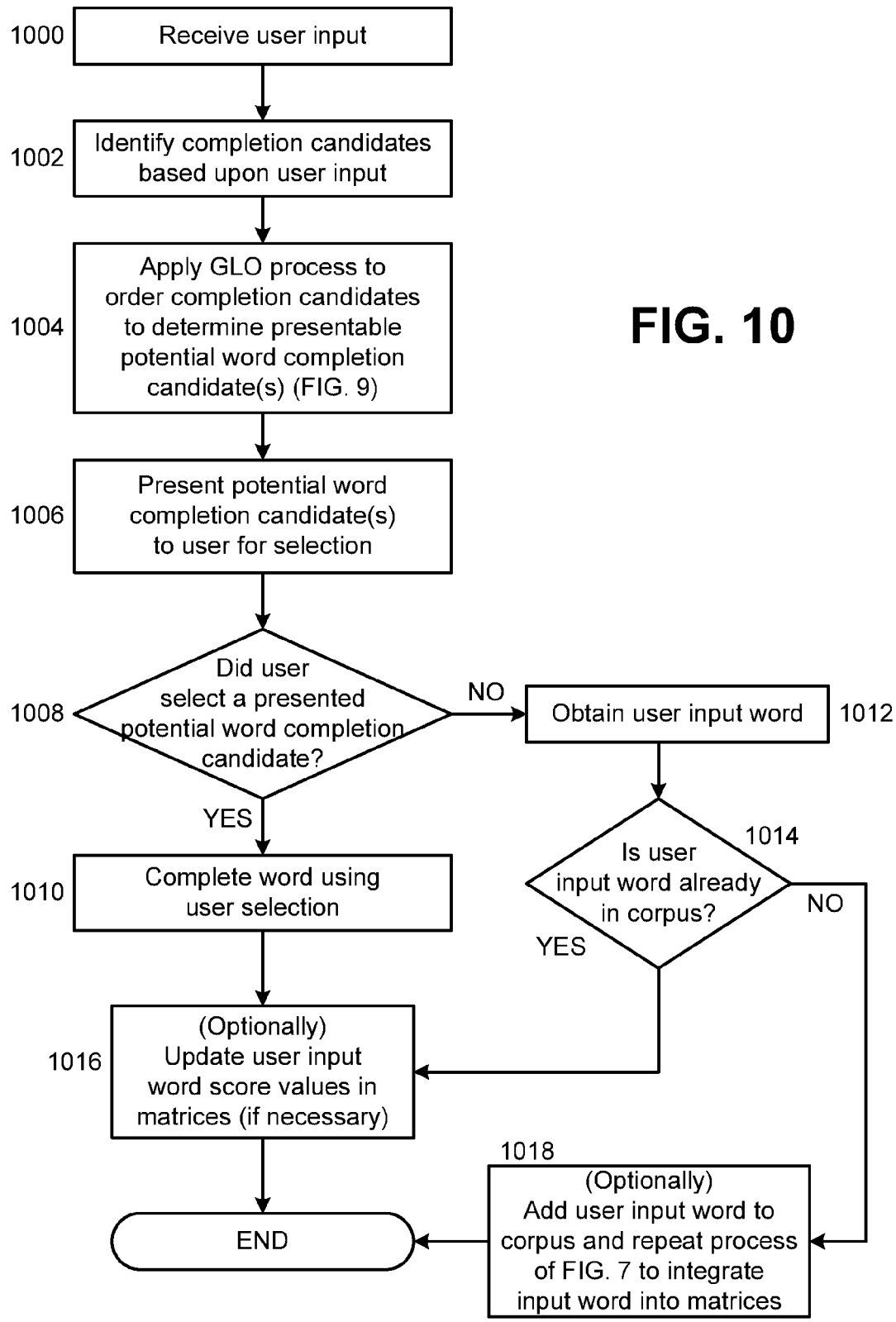

US 8,930,181 B2

AUTOMATIC DYNAMIC CONTEXTUAL DATA ENTRY COMPLETION

FIELD OF THE INVENTION

The present invention relates to information processing and, more particularly, computer, cell phone, personal digital assistant, or other similar device-based text entry.

BACKGROUND OF THE INVENTION

In modern life, there are a number of devices, notably digital computers and multifunctional handheld units that involve data entry, typically text, including for example cellular phones and other devices like organizers and handheld computers. For all of these, one important use is the entry of linguistic items like words, phrases, and sentences. For example, a user may create an unstructured text document or might formulate an email message or a short text message to be sent as an SMS message on a cell phone. In such cases, text entry may occur through use of a keyboard or stylus for some handheld computers or cell phones, etc. However, data entry can be difficult when the keyboard is relatively small as it is on a handheld cell phone, organizer or computer, or uses individual keys for entry of multiple letters, text, especially when a large number of characters must be entered. Similarly, with devices employing a stylus for text entry, entry of text can be slow and burdensome.

Automated word completion programs have eased the burden somewhat. Such automated word completion programs have appeared recently in a variety of applications in a variety of devices. These programs are typically based on either predefined word suggestion lists (e.g. a dictionary) or are culled from the user's own most recently typed terms, the latter often called MRU (i.e. "Most Recently Used") programs. For example, the former type of program is based on a pre-given word suggestion list based on a dictionary augmented with information about which words are more frequently used. If a user types the characters "su" in a document, then it might suggest "super" as the appropriate word completion based on the fact that it belongs to the pre-given word suggestion list and has a high frequency of use in general English. On the other hand, the latter type of program would suggest a word completion based on the user's own recently used words (e.g. "supreme" may be suggested to a lawyer who has recently input "Supreme Court"). Such programs are often found in web browsers for example and will suggest the most recently used "uniform resource locator" or URL (e.g. www.google.com when the user types "www.g") as characters are input.

A third type of program is able to detect that the user is in a particular type of field (e.g. the closing of a letter) and will suggest word completions (e.g. "Sincerely" when the user types "Si") based on a more limited "contextual" list. An extension of this is to maintain many separate word suggestion lists and allow the user to choose an appropriate list for each document the user creates. Other variants allow users to actually insert entries manually into word suggestion lists (e.g. a name and address) or to maintain frequencies of word usage by a user and thus, rather than offering the most recently used word, offer the user's most frequently used words.

SUMMARY OF THE INVENTION

While the methods delineated above have many useful features, there is still a lack of a true context based system that is dynamic and automatic and thus, there is still much room for improvement when it comes to data entry in such devices. Systems that maintain separate word lists and allows the user to choose an appropriate list are contextual to some degree, but still have the drawback of requiring the user to make a list selection each time, something that can become annoying for a user who typically creates several documents within the course of a single day. Moreover, separate word suggestion lists are still inefficient because they are not automatically generated but instead depend on the user's guidance and input.

The present invention combines certain features from existing techniques but goes significantly beyond them in creating a family of techniques that are automatic, dynamic, and context based as explained in greater detail herein.

One aspect involves a method performed in a computer device having associated therewith a plurality of unstructured documents having words therein. The computing device has associated therewith a way for a user of the computer device to provide input of at least components of words. The computing device also includes at least one processor. The method involves receiving in the computer device as an input, at least one component of a word; based upon the input, accessing using the computing device, at least one stored matrix accessible to the computer device, the at least one stored matrix containing words from the unstructured documents and, for each word, a value for at least one score type; retrieving from the at least one stored matrix at least two words as potential completion candidates and each's associated value for the at least one score type; based upon a lex ordering specifying an order in which values of score types are to be analyzed; analyzing the potential completion candidates by calculating an absolute value of the difference between the values of the potential completion candidates for a first score type specified by the lex ordering and comparing the absolute value of the difference to a threshold; when the threshold is met, ordering the potential completion candidates such that the potential completion candidate with the greater value for the first score type is ahead of the potential completion candidate with the lesser value for the first score type; and presenting at least the one of the potential completion candidates that was placed ahead to the user in response to the input such that the user can select the presented at least the one of the potential completion candidates to complete the user's input.

Another aspect involves a method performed in a computerized character entry system. The method includes receiving an input into the computerized character entry system from a user; identifying at least two completion candidates from at least one matrix based upon the user input, each of the at least two completion candidates having an associated value for each of at least two score types; performing a Generalized Lexicographic Ordering (GLO) process on the two completion candidates based upon the score types and an analysis of values for the score types according to a specified lex ordering, so as to obtain a presentation order for the at least two completion candidates; based upon the presentation order, presenting at least one of the completion candidates to the user for selection; and if the user selects a specific completion candidate as a result of the presenting, completing the user's input using the specific completion candidate.

The advantages and features described herein are a few of the many advantages and features available from representative embodiments and are presented only to assist in understanding the invention. It should be understood that they are not to be considered limitations on the invention as defined by the claims, or limitations on equivalents to the claims. For instance, some of these advantages or features are mutually exclusive or contradictory, in that they cannot be simultaneously present in a single embodiment. Similarly, some advantages are applicable to one aspect of the invention, and inapplicable to others. Thus, the elaborated features and advantages should not be considered dispositive in determining equivalence. Additional features and advantages of the invention will become apparent in the following description, from the drawings, and from the claims.

BRIEF DESCRIPTION OF THE FIGURES

FIG. 3 illustrates an example documents versus words matrix used to compute contextual associations with an example implementation of the invention;

FIG. 5 illustrates an example matrix of pairs of words used to compute contextual associations in the alternative example implementation of the invention;

FIG. 6 illustrates an example set of word lists for a word completion example involving the alternative example implementation;

FIG. 7 illustrates, in simplified form, an aspect of an alternative approach whereby the initial system is set up;

FIG. 8 illustrates, in simplified form, another aspect of the alternative approach;

FIG. 10 illustrates, in simplified form how the GLO process is used for word completion in a character entry system.

DETAILED DESCRIPTION

Figure 1:
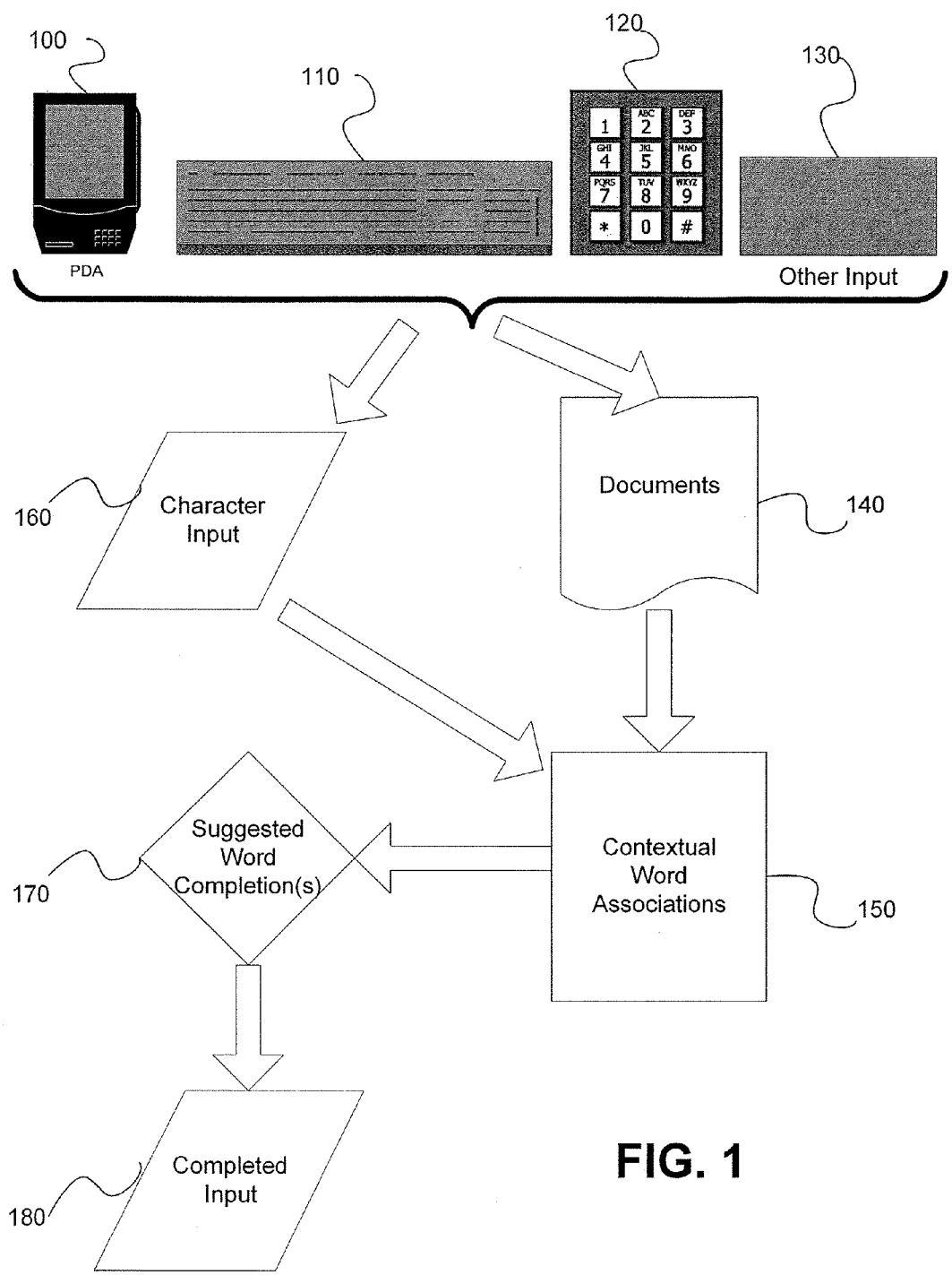
FIG. 1 illustrates, in simplified form, a top-level flowchart for the automatic completion of character input using contextual word associations.

The present claimed invention can be used with a variety of electronic devices. The minimum requirements for any such device are some means for accepting textual input from a user, one or more processor(s) that execute stored program instructions to process the input, storage for the data and the program instructions and a display or other output device of some sort to make output visible or available to the user. Representative, non-exhaustive, example input devices can include, but are not limited to, a keyboard, a handwriting recognition system that makes use of a stylus, a touch pad, a telephone keypad, a pointing device like a mouse, joystick, trackball or multi-directional pivoting switch or other analogous or related input devices. The storage preferably includes non-volatile memory, and can also include volatile semiconductor-based memory, electro-magnetic media, optical media or other types of rewriteable storage used with computer devices. If a display is used, the display may be small and capable of displaying only text or much larger and capable of displaying monochrome or color images in addition to text. If another output device is used, like a text to speech converter, appropriate implementing equipment will be included. Although described, for purposes of clarity, with reference to keyboard-type entry, it is to be understood that the present invention is independent of the particular mode of, or device used for, text data entry.

At the outset, it should be noted that, for the purposes of this invention, a "document" as used herein is intended to be a very general term covering one or more characters, whether alone or in conjunction with numerals, pictures or other items. A document's length can vary from a single "word" to any number of words and it can contain many types of data other than words (e.g. numbers, images, sounds etc.). Thus, ordinary documents such as pages of text are documents, but so are spreadsheets, image files, sound files, emails, SMS text messages etc.

As noted above, a "word," for the purposes of this invention, can be considered to be more than a string of alphabetic characters, it may include numeric and other symbols as well. Broadly, the invention provides contextual completion of character strings, where a character string includes not only alphabetic words but any other discrete collection of characters, symbols, or stroke based pictographs or ideograms, for example, those used in languages like Chinese, Korean and Japanese, and thus can benefit from use of the present invention. Thus, although for simplicity the term "word" is used in the following discussion, it should be understood to encompass any discrete collection of characters, symbols or other stroke based representations of communicative concepts, thoughts or ideas. Thus, the present invention, although described with reference to English, is independent of any particular language. It can be used for phonetic, pictographic or ideographic languages when the characters, pictograms or ideograms used therein (or "stroke" components thereof) are considered "words" and thereby are intended to be encompassed by the terms "text" and "textual." In some cases, an entire pictogram or ideogram will be usable as a "word" as described herein with entry of a component of the pictogram or ideogram, such as a defined stroke, being analogous to entry of a letter in English. Likewise, for simplicity in the following examples, the terms "typing" or "typed" are used to describe data entry. However, those terms should be broadly read to encompass any and all methods of data entry, whether involving entry through use of a keyboard, a pointing or selection device, a stylus or other handwriting recognition system, etc. They are not in any way intended to be limited only to methods that make use of a typewriter-like keyboard.

Examples of devices that can use and benefit from incorporation of the invention therein range from large computer networks, where an implementation of the invention may be part of or an application on the network, to small portable hand held devices of more limited or specialized function such as cell phones, text messaging devices and pagers. Implementations incorporating the invention can be used to assist users in interacting with large databases by helping in the entry of search terms or in data entry. Other implementations incorporating the invention are particularly useful for portable devices, in which the input device is limited by size and difficult to work with, because the automatic completion of character string entries provides greater benefits in such devices. Still other implementations incorporating the invention are particularly useful for devices used by those with physical handicaps. In addition to the methods of character input already mentioned, devices intended for use by handicapped individuals may rely on some type of pointing device to select individual characters for input. The pointing device may be controlled by movement of the eyes, head, hands, feet or other body part depending on the abilities of the particular individual. The present invention may also be used with "text" that is implemented in braille or other tactile representations for individuals with impaired vision.

In overview, in connection with the invention, words from one or more documents are associated, in either a fully or partially automated way, based on context. Context is derived from the co-occurrence of individual words in documents. In addition, the associations can be pre-computed and static or dynamic so they can thereby evolve and improve with continued use.

For example, in an implementation of the invention, an association between "finance" and "summary" may be generated but not one between "finance" and "sugar;" in this case, if a user has typed in the word "finance" followed by the characters "su," then, based on the association, the invention will suggest "summary" as the appropriate word completion rather than "sugar." Here, the word "finance" has provided the context that suggests the appropriate completion; if instead the user had typed "two spoons of" and then the characters "su," and if an association had been generated between, "spoon" and "sugar" rather than "spoon" and "summary" then the invention would suggest "sugar" as the contextually appropriate completion. As more words are entered in the document, the contextual associations become richer.

The invention permits the use of different techniques for actually creating the associations. As a result, for purposes of understanding, two fully automated example techniques are described below with the understanding that semi-automatic implementation techniques are considered to be literally the same as the fully automated ones. The automatic or manual nature of a technique is, in most respects, independent of the invention because it relates more to the ease of processing large amounts amount of text, not the technique itself.

The general approach is illustrated, in simplified overview, in FIG. 1 with respect to a single document. The approach begins with a device such as a personal digital assistant, cell phone, computer or other device (100, 110, 120 or 130) which has documents (140) stored in its memory. These documents are used to create associations (150) between pairs of words or character strings within the document and use these associations to suggest word or character string completions (170) to the user entering text (160) in a document. The associations among the words or strings may be static or dynamic. With implementations incorporating a more dynamic approach, as the user adds to a document or creates more documents on the device, the associations are recomputed or suitably augmented. This will alter the set of associations by either adding new associations, deleting existing associations or both. Thus, with implementations of the automatic contextual word completion system having this "dynamic" aspect, the system evolves as the user adds to or creates new documents and thus generally improves with use. Extensions to these implementations further allow the device to impliedly track the user's evolving interests.

Associations between words can be computed in a variety of ways and, as non-limiting examples, two alternative automatic methods of doing so are described.

In the first method, the first step is to assess the similarity of words within one document or from one document to other documents that may exist on the user's device. In this method, contextual associations are arrived at by grouping documents based on similarity and creating lists of words that are common to each group. There are many known methods to assess document similarity including the Jaccard, Dice or cosine coefficients and the K-vec methods. For purposes of explanation, one such example similarity assessment method, based on treating documents as vectors in a multidimensional space, is used, it being understood that, depending on the particular implementation, other similarity assessment methods can be used in addition to, or instead of, those used in the examples described herein for practical reasons.

Figure 2A:
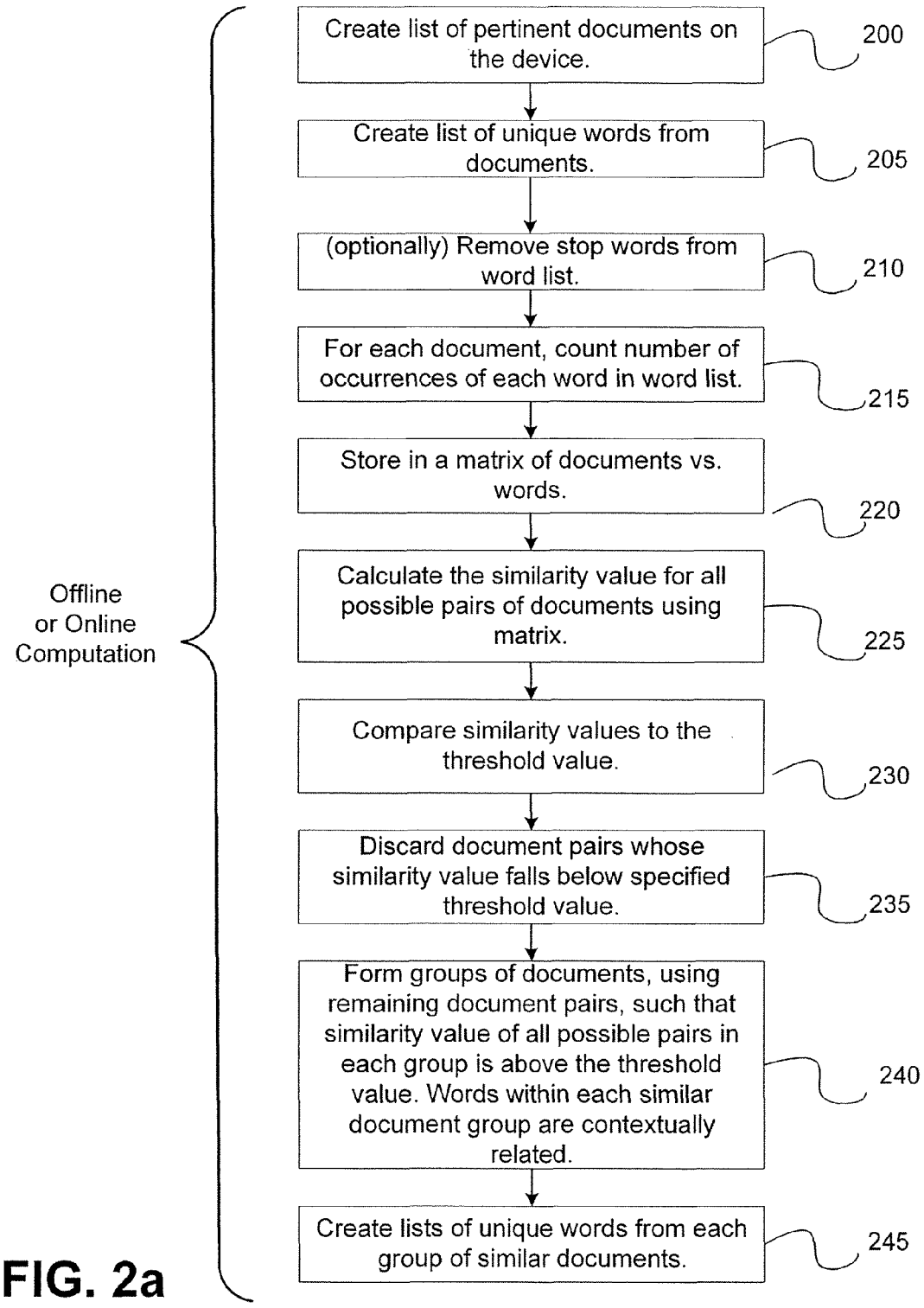
FIG. 2a illustrates a simplified flowchart for computing contextual associations in one example implementation of the invention.
Figure 2B:
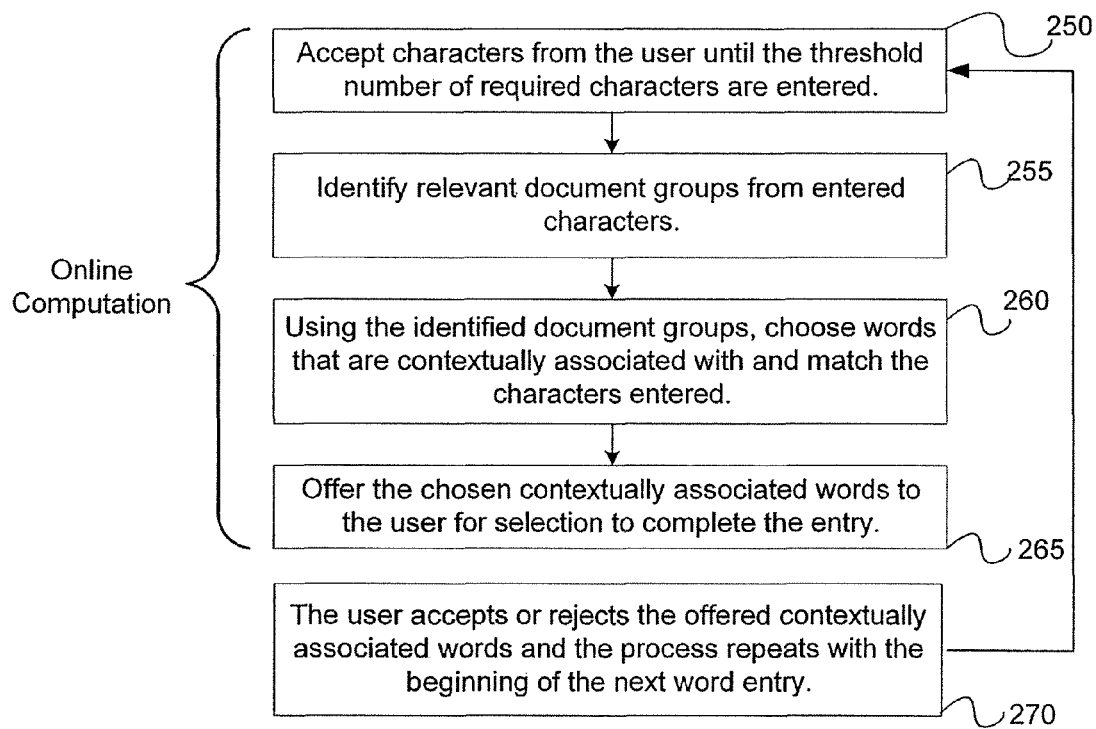
FIG. 2b illustrates a simplified flowchart for the selection of contextual associations in an example implementation of the invention.

This example method is outlined in the flowcharts in FIGS. 2a and 2b. The method starts by creating a list of all the pertinent documents (200) on the device. From this list of pertinent documents a list of unique words is created (205). An optional step, is to remove stop words from the word list (210). Stop words are described in greater detail below but include words like "the," "at" and "in." For each word in the word list, the number of times it occurs in each document is counted (215) and this number is stored in a matrix of documents vs. words (220). This matrix is used to calculate a similarity value (225) for each possible pair of documents in the document list. The similarity value for each document pair is compared to a threshold value (230) and those document pairs whose similarity value falls below the specified threshold value are discarded (235). The remaining document pairs are used to group documents such that the similarity value of each possible pair in each group is above a specified threshold value (240). Lists of unique words from each group of similar documents are created (245). Words within each of these lists are contextually related. The steps of the example method to this point may be carried out independently of user text entry or, in implementations where the dynamic aspects of the invention are utilized, carried out simultaneously with user text entry, so that the contextual associations are updated as the user enters more words into the device.

Once at least an initial set of contextual associations exists, it can be used at some point thereafter. The approach to use is as follows. The device accepts character input from the user until a specified threshold number of characters has been entered (250). Using the entered characters, relevant word lists are identified (255). Due to the processing, the words within these identified lists are deemed contextually related and thus, words in the identified lists having a corresponding initial character string matching the entered characters are chosen (260) to be offered for selection by the user to complete the character entry (265).

The above referenced process can be fully understood by way of the following simplified example. To assess the similarity or dissimilarity of documents, one way of thinking of a document that contains one or more words is as a bag or multiset of words. A bag or multiset is like an ordinary set in mathematics, a collection, except that it can contain multiple occurrences of the same element. For example, {book, cape, pencil, book} is a bag containing four words of which the word "book" appears twice. The order of occurrence of elements in a bag does not matter, and could equally be written as {book, book, pencil, cape}. Also, any bag can be converted to a set just by dropping multiple occurrences of the same element. Thus, the example bag above, when converted to a set, would be {book, cape, pencil}. To create the bag or multiset, the contents of a document with the exception of numbers which are a special case are stripped of all internal structure (e.g. syntactic structure, punctuation etc.) including all non-lexical items like images, sounds etc. The resulting stripped document would be a bag or multiset of words as described above which may also include numbers and in which some words may occur multiple times. For a user who has a device with a number of stored documents, each pertinent document is similarly stripped down to form bags and the mathematical union of these bags can be taken to form a larger bag.

As a side note, optionally, a certain class of words, typically called "stop words," are removed from such document-derived bags. Stop words are words like "the," "of," "in" etc. and are removable because they usually are not very informative about the content of the document. Stop words, if removed, can be removed from the bags either before or after a mathematical union of the bags is made, as the end result is the same. Typically stop words are identified in a list which can be used for the exclusion process. Since the stop word removal process is well known it is not described herein. In addition, in some implementations where a stop word list is used, the list may be editable so that additional words can be defined as "stop words." For example, otherwise non-trivial words that are trivial in the particular context because they occur too often in that context (e.g. words like "shares" in stock related government filings).

By way of simplified example (FIG. 3), if the user has just two documents on a device: "d1" (306) made up of "an apple, apple cider and an orange" and "d2" (308) made up of "a paper apple" then, each corresponding bag is {apple, cider, apple, orange} and {paper, apple}. Their union is the larger bag {apple, cider, apple, orange, paper, apple} and a set for the bag would be {apple, cider, orange, paper}.

A matrix (300) is then formed with for example, each element in the set of words derived from the documents on the user's device listed along the columns (302) of the matrix and each document itself (symbolized in some way) along the rows (304) of the matrix. In the cell corresponding to the intersection of a document "d" with a word "w," the number of times "w" occurs in "d" is entered (318). For the simple example above, as shown in FIG. 3, for the cell corresponding to the intersection of the row for the first document "d1" and the column for the word "apple" a "2" (318) is entered since it occurs twice in document "d1." This occurrence frequency information is obtained from the document bags. If a word does not occur in a particular document at all, a zero is entered in the corresponding cell. Note that depending upon the number of documents and the number of words, the size of the matrix can be exceedingly large. Moreover, there is no significance to whether rows list documents and columns list words or vice versa—the contents of the rows and columns could be exchanged without affecting the invention.

Once the matrix is created, each document is treated as a vector in a multidimensional Euclidean space, with the number of dimensions being the number of words or columns of the matrix. Thus, the simplified example of FIG. 3, each of documents d1 and d2 can be treated as a four dimensional vector since there are four elements in the corresponding set {apple, cider, orange, paper}. Notably, by using this approach, the words can also be listed in any order in the columns, for example, in order of first or last occurrence, randomly, alphabetically, by number of letters, stroke type, stroke count, etc., in forward/increasing or reverse/decreasing order.

The similarity between d1 and d2 is then estimated by measuring the cosine of the angle between vectors d1 and d2. The higher the cosine value, the greater the similarity, the lower the cosine, the greater the dissimilarity. If the value is the maximum possibility of "1," the vectors are fully aligned in multidimensional space and the two are identical. On the other hand, if the cosine reaches its minimum of "0," the vectors or documents are completely dissimilar (i.e. they are orthogonal). For the absolute intermediate cosine value of "0.5," the documents are roughly as similar as they are dissimilar.

This method can thus be extended where more than two documents exist, by pairing the documents in all unique combinations and performing the same similarity analysis on all pairs of documents that are pertinent (i.e. under consideration) from the device of the user. Note that it is likely that every "document" on the user's device may not be "pertinent" for purposes of this invention, for example, it will likely be desirable to differentiate between the user's documents and documents that may be present for other reasons (e.g. programs, system configuration file contents, system data, etc.) and thus irrelevant. For purposes of understanding the invention, it should be assumed that non-pertinent documents have been excluded in some manner, whether manually or automatically.

As to all of the pairs, cosine values are computed and a threshold value is chosen. The threshold value represents a divider in which all cosine values above the threshold are accepted as indicating meaningfully similar document pairs and below which the document pairs are sufficiently dissimilar so as to be considered not meaningfully related. In other words, a range of values is taken and on the basis of those values, an arbitrary division is formed to differentiate, and deem each document, meaningfully similar or dissimilar relative to each other document.

In application, the threshold value mentioned above is initially a preset parameter, the value of which may be different for different types or classes of target users. However, in some implementations, the threshold can be adjusted, whether over time through use or because of changes in the quantity or contents of the pertinent documents, and either by program modification or through user action. In other implementations, it can be adjusted automatically or by implication as is discussed in greater detail below.

In all cases, what is obtained, either through the vector space method described above or through other analysis approaches, such as Jaccard, Dice or cosine coefficients, the K-vec methods or some other method, is a judgment of similarity and dissimilarity of document pairs in the pertinent document collection or set.

This similarity judgment is then used to form groups of documents, each group of which contains only documents that are sufficiently similar to one another when compared in a pair wise fashion. Note that the relationship of similarity is reflexive and symmetric, but it is not necessarily transitive. This means that the groups may not be disjoint i.e. the same document may belong to more than one group, particularly in implementations where a document need not be sufficiently similar to every other member of the group, but only some specified portion thereof. In other words, as a result of the grouping, two or more groups will be formed wherein each document is meaningfully similar to at least some specified portion of the other documents in that group. In general, each group will have the following characteristics: each document in the group will be sufficiently similar (i.e. be above the threshold) with respect to at least some specified portion of the group (in practice, likely preset at well more than 50% if stop words are not removed), each group will be differentiable from any other group by at least one member, and each group will not be a simple subset of any other group.

In addition, some implementations may involve large numbers of nearly identical documents such that the common information is not meaningful because it is ubiquitous and the differentiating information may be too unique relative to each other to be of interest. One such example, would be certain filled out forms. In such a case, a second very high threshold can be used as a "screen" whereby copies of documents exceeding this threshold are separately grouped, the mathematical intersection of the documents are used to form a "stop word"-like list, the intersection-based stop word list is then used to strip the copies of those words, and then the copies are used in place of the actual documents in the overall grouping process. In this manner, the ubiquity can be handled without sacrificing the potential contextual relevance of the unique information to other pertinent documents.

Once groups of similar documents have been made, lists are formed for each group containing all non-stop words in the union of the sets corresponding to each document in the group. As with the lists above, these lists may be arranged in any of a variety of possible orders (e.g. alphabetical, first/last occurrence, etc.). In addition, the lists can dynamically change, for example, by repeating the above processing (in whole or part) as time progresses and the user creates/modifies/deletes documents.

As a result, the lists created as described above are essentially lists of all words associated with each other i.e. once the lists have been computed, the associations mentioned earlier have been computed as well. By way of simple example with respect to the two documents d1 and d2 introduced above, if a list contains the words {apple, cider, orange} then it can be assumed that these words are associated with each other. The word "paper" from d2 above is not on this list and so is not associated with "apple," "cider" or "orange" through this list, but may be associated with apple through another list "d3" that contains {apple, orange, knife, paper, plate}. It may also happen that there also is another list "d4", based on another group of documents, that contains {orange, paper, peel} in which case "orange" and "paper" would be associated with each other through that list as well as through "d3".

Thus, based upon the above, if a user were to type "apple" followed by the characters "ci," then the program instructions implementing this aspect could check the lists, find that "apple" and "cider" are associated through a list, and thus offer "cider" to the user as a possible completion of the incomplete word. Similarly, if a user were to type orange followed by "p", then "paper" and "plate" would be related to "orange" through list "d3" and "paper" and "peel" through "d4". Depending upon the next letter entered, the "contextually related" contents of one of the lists would be excluded or the one word in common "paper" would be provided as the "contextually related" completion word.

In the first of the immediately preceding examples, a single word "apple" is used as the basis for choosing "cider" as the possible completion. Whether a single word, multiple words, sentences or even longer segments of text are used as the basis for choosing the possible word completion is dependent on the particular implementation. For simple devices, limitations on memory and processing resources will likely dictate that no more than a few words of prior user input be used as the basis for choosing the word completion. In other implementations this could be a user selectable parameter, a preset parameter in the device or could be adjusted dynamically by the program.

At this point it should be understood that document similarity is based on what words, if any, are shared by each of the pertinent documents and in what frequencies when similar documents are grouped and used to form lists. Thus, by grouping "similar" documents, an assumption is made from the similarity analysis that words that belong to the same broad subject matter are being collected—i.e. "similar" documents are necessarily likely to contain words that pertain to the same subject matter. Hence, the derived associations are likely to be more relevant to a user who is typing a document on that subject than other alphabetically similar or most recently used, but non-associated, words.

While the formation of groups is based on the calculated similarity value between pairs of documents, the details of how the similarity value is used can vary depending on the particular implementation of the invention. For example, as defined above, all document members of a group must have a similarity value above the set threshold value when compared to some portion of the other member of the group. However, that "portion" can be more or less restrictive. The most restrictive definition requires the portion be all members of a group and leads to the largest number of groups and development of word lists that tend to be shorter but the contextual associations among words in the list tend to be stronger. The least restrictive definition of a group is that any one document of the group need only have a similarity value above the threshold value when compared with any one other member of the group. Although it will form the fewest groups, this definition will, for practical purposes, never be used. In practice, if a pre-set threshold is specified, it will likely be set so as to have a reasonable number of groups while having meaningfully usable relationship lists. As currently contemplated, an initial threshold within the range of 50% to 90% would be used as a reasonable empirical starting threshold. Notwithstanding the foregoing, the threshold can be initially set to a value outside that range or can, in some implementations, ultimately end up outside that range either through evolution or affirmative changing of the setting. Regardless of how restrictive the definition of a group is, whenever a new document is found to have a similarity value that is below the set threshold when compared to all of the existing documents on the device, that document becomes the first member of a new group. When less restrictive definitions of a group are used, groups, and their associated word lists, become larger and the strength of the contextual associations between words in the list becomes weaker. Thus, the threshold will clearly be a parameter that, even with its initial value, will vary with the particular implementation of the invention.

It will now be apparent that the threshold value for similarity plays an important role in the formation of groups and thus the lists of contextually associated words. The ability to distinguish between closely related documents will also increase as the threshold value is set higher. Therefore a high threshold value may be appropriate for an attorney who specializes in real estate matters and who creates documents, such as sales contracts or leases, which have a high degree of similarity, while a low threshold value may be appropriate for an editorial writer who produces documents on a wide variety of general interest topics.

The threshold value may be set by the designer of the device depending on the intended use, selectable by the user or set dynamically by the program implementing the invention. One alternative implementation method which, in effect, dynamically sets the appropriate threshold value involves specifying the maximum number of groups that can be created. By doing so, the system will be required to start at a relatively high threshold value and, if the resulting number of groups exceeds the specified maximum, it will adjust the threshold downward until the maximum number is not exceeded. If no more than five groups are specified then the threshold value will be lower than if no more than 20 groups are allowed. The program implementing the invention can be further optionally configured to, as documents are added/changed/deleted, monitor the number of groups and adjust the similarity threshold value so that the number of groups is continually within the specified limit. Additionally, the limit can be made variable, for example based upon the number of documents in the system. In this manner, once a greater threshold number of documents is exceeded, a new maximum can become effective so as to allow for more groups and maintain a meaningful granularity.

Another optional additional method that may be used by the program implementing the invention, is to dynamically set the similarity threshold value by monitoring the performance of the word completion system. For optimal performance of an automatic word completion system, the system must strike a balance between the case of rarely offering a word completion but the completion offered is always appropriate, and the case of always offering a word completion but the completion offered is often inappropriate. By monitoring how often the system offers a possible word completion to the user and how often the user accepts the offered word completion, the program can determine if the strength of the contextual associations is too high or too low. If the user is frequently having to discard suggested word completions, the program can increase the strength of the contextual associations by raising the threshold value or, as discussed above, making the definition of a group more restrictive or both.

Yet another optional use of the similarity threshold value is to rank possible word completions so that the most likely word completion is offered to the user first. The ranking is accomplished by computing the word associations using different similarity threshold values. In implementations of the invention where the user is offered multiple possible word completions, words that are contextually associated with the partial input based on use of a high threshold value would be offered at the top of the list, while those words that are only contextually associated based on the use of a low threshold value, would be offered at the bottom of the list.

To further illustrate how different documents may be grouped, consider a collection of four documents, a draft of the Declaration of Independence, the signed version of the Declaration of Independence, the United States Constitution, and an article reviewing the foundation of United States constitutional law. In the case of a user who has documents covering widely different topics such as the history of baseball, art and literature a relatively low similarity threshold may be set so that there are only four groups of documents. The Declaration of Independence, Constitution, and constitutional law article would likely all be in one group as they are clearly related documents but would not be related to documents on baseball, art or literature. In the case of another user who happens to be an attorney and who has only legal documents on his device the similarity threshold value would have to be set higher so that different classes of legal documents could be distinguished. If the threshold value were set too low, then the fact that words such as "liberty" are present in all four of the documents in our example collection, would be enough for all four documents to be placed in the same group. With a higher threshold value, words like "creator," which only appears in the Declaration of Independence, and "Senate," which only appears in the Constitution and the constitutional law article, would result in these documents being placed in two different groups, one on the Declaration of Independence and one on the Constitution.

Figure 4A:
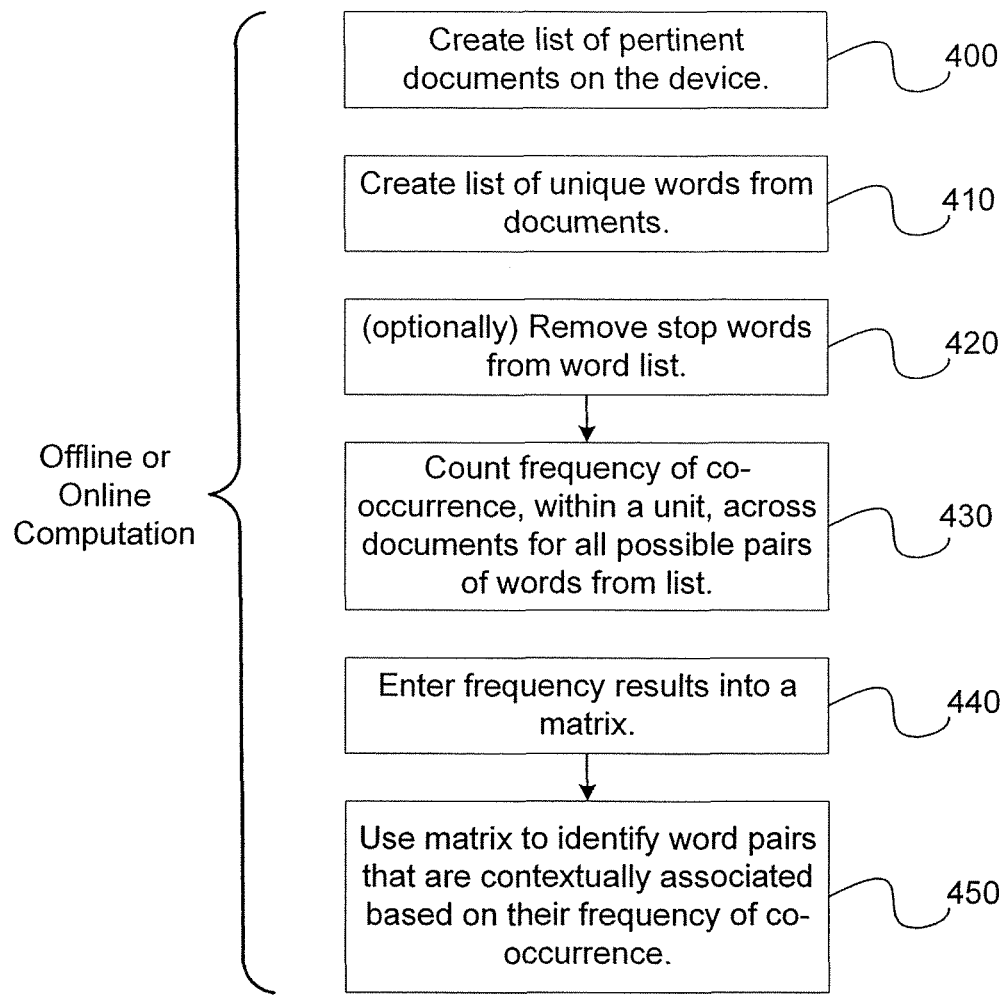
FIG. 4a illustrates a simplified flowchart for computing contextual associations in an alternative example implementation of the invention.
Figure 4B:
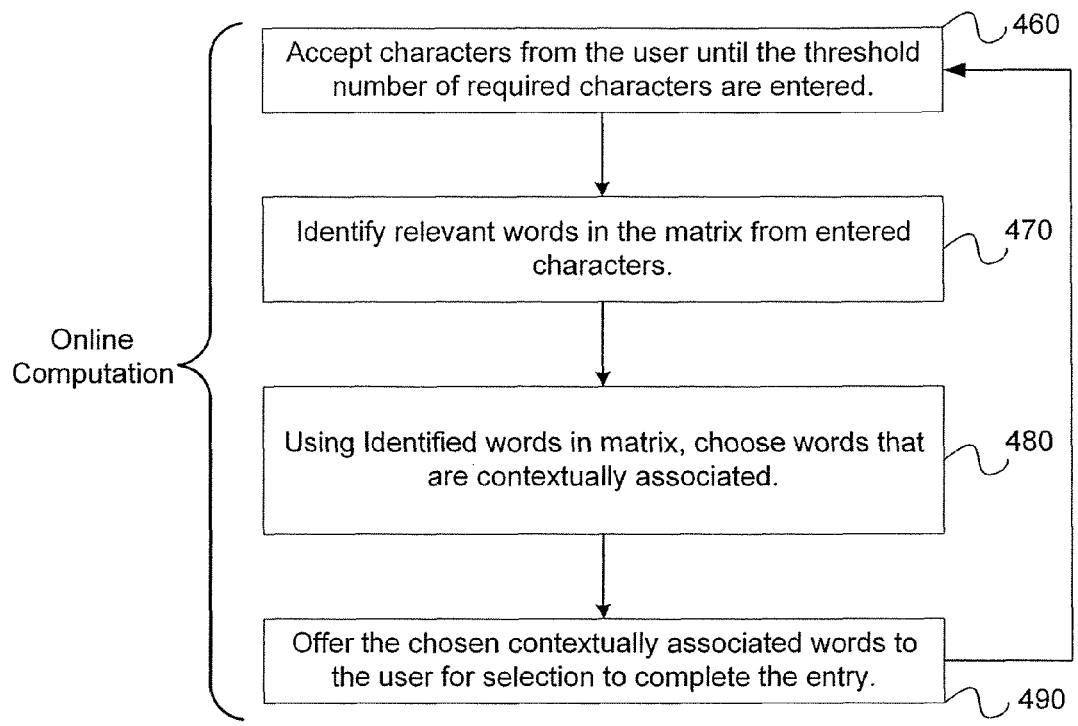
FIG. 4b illustrates a simplified flowchart for the selection of contextual associations in an alternative example implementation of the invention.

A second example method for computing contextual associations between words, suitable for use with the present invention, is outlined in the flowcharts of FIGS. 4a and 4b. As in the first example method, the second method begins by creating a list of pertinent documents on the device (400) and creating a list of unique words from these documents (410). Again, an optional step is the removal of stop words from the word list (420). For all possible pairs of words from the list, the frequency of co-occurrence within a unit of text is counted (430) and this result entered into a matrix (440). The particular "unit" that is chosen will be a parameter to be decided based upon various factors present for the particular implementation. Generally, if the documents being considered are fairly long (such as a thesis, book or report), then a paragraph is typically considered as the appropriate unit; if the documents being considered are fairly short (e.g. like an SMS message on a cell phone or an e-mail), the whole document may be considered as a unit. Other "unit" options are, for example, the sentence, sections of a document, chapters, pages columns, etc. The unit parameter may be initially fixed, permanently fixed, modifiable or dynamic. In fact, in some implementations, the unit may even be allowed to change based on the length of the document and the portion involved. For example, for patent documents, the appropriate "unit" for the abstract might be the paragraph, for the claims it might be the line or sentence, and for the detailed description it might be, for example, a section, column, paragraph or sentence.

The rows and columns of the matrix are lined with words from the word list. As before, the interchange of rows and columns changes nothing with respect to the invention. The matrix containing the co-occurrence data is used to identify word pairs that are contextually associated, based on their frequency of co-occurrence. The steps of the method to this point can be performed independently of user text entry or, in implementations where the dynamic aspect of the invention are realized, these steps can be performed simultaneously with user text entry so that the contextual word associations are updated as the user enters new text into the device.

Once the contextual word associations have been determined, the device accepts character input from the user until a threshold number of characters are entered (460). Words in the matrix that match the entered characters are identified (470) and the identified words that are contextually related are chosen (480) and offered for selection by the user to complete the character entry (490).

Note that, as described above, the matrices in FIGS. 3 and 5 have been filled with direct co-occurrence information. However, this is not required because there are many other variants of this approach that can be used to the same, better, or in some cases less, effect (Oust as there are many different ways of measuring document similarity) depending upon the particular implementation and documents involved. Thus, the raw information need not be used as is but may, for example, be normalized in some way, ranked, and so on.

Optionally, once the co-occurrence matrix is prepared, it can be reorganized so it is ordered, for example, according to which co-occurrences are higher relative to each letter of the alphabet.

In an example system implementing this method of the invention, and in reference to the matrix (500) in FIG. 5, when a user types "finance" followed by the characters "su," the system would check the co-occurrence matrix in the row corresponding to "finance" (502) to see which words starting with "su" have the highest co-occurrence score. Thus, if "summary" has a higher score than "sugar," the system would offer "summary" rather than "sugar" as the appropriate completion word.

In yet another implementation, variants of the above two methods can be run together as a cross-check or to get more suggestions. However, limitations of speed and memory may render this dual method approach impossible, impractical or overly costly for some implementations.

It is to be understood that, while the two approaches have been described in terms of bags and sets, because they are conceptually the most appropriate mathematical description, the actual implementations of these data structures can vary (e.g. they can be lists rather than bags or sets), the particular data structure used to accomplish the result being unimportant to the invention.

Optionally, in some implementations the words in the lists are further processed to reduce them to stemmed form. That is, they may not be the full words but rather words with their endings suitably modified, for example, by one of the many available stemming algorithms. This would enable the program to handle words like "finance," "financing" and "financial" or "remain," "remainder" and "remaining" in a uniform manner so that the user will be offered the same suggestions independent of the particular variant of the contextual words he has typed. However, stemming is optional. There may be advantages in not stemming words in some implementations, because the system can differentiate among them if the words are not stemmed and thereby offer one variant on one occasion and another on another occasion.

The number of initial characters that are needed in order for the system to make a suggestion to complete the word is also a parameter that can be preset or set by the user depending on the implementation. As with completion algorithms of the prior art, in most implementations, this is 2 or 3 characters. However, word suggestions may start from the very first character. A second parameter that needs to be defined for a particular implementation is how long the full word needs to be in order for the system to even make a suggestion. As contemplated, the minimum word length is 5 characters or strokes although minimum lengths of 2 or 3 characters (or strokes) can be used. That is, if the characters "su" were typed, the system may not suggest "sure" even if it happens to be the best association because it is too short a word. On the other hand, "summary" and "sugar" are acceptable candidates as they meet the length requirement. This minimum length is also a parameter that will vary with different implementations and possibly different users. Again, the minimum length may be as short as one character so that any and all suggestions (up to the "n" best suggestions) may be offered. Once the associations have been computed the resulting information is used to suggest a word completion.

Having described component aspects in simplified and theoretical form, particular example implementations are now discussed with reference to the example word lists of FIG. 6 (600).

Assume groups of documents to be used have been created, words that appear in each group collected and alphabetized to form the series of lists of FIG. 6.

EXAMPLE 1

In one simplified example implementation, a user types "finance" followed by the characters "su." The system checks all the word lists for the word "finance." It would find that it just occurs in word list #1 (602). Next, it checks all words in that list (or lists, if there is more than one where "finance" occurs) that begin with "su" and it finds the word "summary." As a result, the system offers to complete the user's word with "summary." The user can opt to accept that suggestion or not by the appropriate action, in this case pressing an appropriate key (e.g. the "Enter" key). Note, that as a result of the above processing, "sugar" is not on this list and thus it is judged not to be a contextually relevant suggestion.

EXAMPLE 2

In another simplified example implementation based upon FIG. 6, the user types "two spoons of" and then the characters "su." Again, the system looks for the words "two" and "spoon" (the plural ending can be assumed to be stemmed in real time if stemming is used) on the word lists. Because, in this example, the word "of" is on the stop word list it is ignored. The system finds "two" in word lists 2 (604) and 3 (606) and finds "spoon" in word list 2 (604). As a result, it looks for words beginning with "su" in all common lists first, i.e. in this example, word list 2 (604). It finds "sugar" in word list 2 (604) and offers it as a suggestion to the user, for acceptance or rejection. In this case, although word list 3 (606) contains the word "summary" which could have been a possible suggestion, it was eliminated because "summary" is associated with "two" through word list 3 (606) but it is not associated with "spoon" on any list.

EXAMPLE 3

In a further simplified example implementation based upon FIG. 6, a user types in "one" followed by the characters "ch." Now "one" occurs in word lists 2 (604) and 3 (606). There is no other information to find a common list or to eliminate any list containing "one" as was done with "summary" in the previous example. In this case, both lists are considered and searched for words starting with "ch." There are two: "chili" in list 2 (604) and "chapter" in list 3 (606). Depending on the implementation, both suggestions are offered to the user for acceptance or rejection or the system can wait until the user types a third character. Note that, if the former occurs, optionally, the system can operate to ignore further character entry for that word or represent a selection based upon the next character entered. This can occur only once or interactively, the former allowing for entry of words not in any list without annoying prompts, the latter allowing for discerning among multiple words with similar starting letters like "heat," "heavy," "heather," "heaven," "hearing" and "health" which all share an initial "hea" or different words having a common root like "finance," "financing," "financial," and "financially." In the example, a third letter is waited for, so when the characters "cha" are typed in, "chili" is eliminated as a possible completion and just "chapter" is offered.

Even when there are multiple words that have been typed as in Example 2, if there are no common lists or if there is more than one list in common, similar options can be employed, i.e. either all of the suggestions are offered or wait until additional characters are entered. If this is done interactively, eventually the system will most likely eliminate possible options until just one or a few can be offered to the user. As with other aspects described herein this can be preset or set/modified by the user, depending upon the particular implementation involved. Some users find it annoying to have too many suggestions while others find it acceptable. Of course, it is also possible that the words already typed do not belong to any word lists in which case, in one example implementation, no suggestions are offered. Alternatively, in such cases, a prior art approach such as providing a word from a standard online dictionary or a word from a most recently used list can serve as a fallback. These again are implementation-specific decisions.

While the above simplified examples reflect the kinds of situations that can arise, by no means do they exhaust all the possible permutations and combinations of situations that might occur in practice in a more commercially suitable implementation. For such systems additional optional extensions can be employed to make the approach faster, more robust, or otherwise more suitable.

One such optimal extension uses frequency information (i.e. the number of times the word occurs in the set of documents under consideration) stored with or otherwise associated with the words in word lists so that when there is more than one choice available to offer to a user, frequency ranking can be used to specify the offering. This is now described with respect to a simplified example matrix presumed generated from a group of documents using a technique described above illustrated in FIG. 5.

The matrix of FIG. 3 is similar to that of FIG. 5 except that only half of the matrix is filled out because the information in the lower diagonal half would be symmetric to the information in the upper half and it was created from a slightly different group of documents. In the example of FIG. 5, the diagonal entries are left blank but it should be understood that they can alternatively optionally be filled with plain frequency information (e.g. the number of times a word occurs in a document or on the device).

EXAMPLE 4

In an example system incorporating this simplified example implementation which uses the co-occurrence matrix of FIG. 5, a user types "finance followed by the characters "su." The system looks up "finance" in the rows (602) and finds the co-occurrence scores of the words starting with "su" in the columns. These are "summary" and "sugar" and their scores are 12 and 1 respectively (identified at the intersection of the two in the matrix (500)). Since "summary" has the higher score, it is offered as a suggestion to the user.

EXAMPLE 5

In another example system incorporating this simplified example co-occurrence matrix the user types "two spoons of" and then the characters "su." Now the word "two" (508) has scores of 3 and 7 respectively for "summary" and "sugar" and "spoon" (516) has scores of 0 and 14 for "summary" and "sugar" respectively. Using any of a number of known possible ways for combining scores to produce a unique or at least a ranked outcome a preferred or selected result is obtained and the corresponding word presented. Clearly, in this example, any reasonable formula (e.g. the sum of the scores) should produce "sugar" as the preferred outcome and offer it as a possible completion to the user or alternatively offer both suggestions with "sugar" optionally ranked first.

EXAMPLE 6

In a further simplified example implementation involving the co-occurrence matrix of FIG. 5, presume a user has typed "one" followed by "ch." The two possible completions as seen from the table above are "chapter" (512) with a score of 6 and "chili" (514) with a score of 8. In this implementation, based upon the scores, the higher score may be chosen or, since the scores are relatively close to each other, a ranked list may be offered. If the two scores had been identical the order of presentation can be based upon, for example, the alphabetical option, the most recently used option or some other such variant can be used to specify presentation order. Alternatively the system can be set up for cases where the scores are the same to wait, without offering any suggestion, until the user has entered one more character(s) (e.g. "cha") in which case, in this example, "chapter" would be the unambiguous choice.

In examining the examples above, it is clear that there will often be cases where there will be more than one possible completion to offer the user. In some implementations, the system will not offer the user a possible completion until the user has entered sufficient characters so that an unambiguous choice can be made. In other implementations, the system will rank the possible completions to be offered to the user based on the contextual associations that have already been computed. For example, words with a higher co-occurrence score, words from more frequently or recently accessed lists, or words from lists that have the greatest similarity, can be offered first. Still further, in some implementations, the rankings can be dynamically set in that they change as the user enters more characters (whether in that word or during the course of document creation).

One representative example of how ranking of multiple possible completions can be achieved is now described. Since multiple possible completions are likely to be the norm rather than the exception in many commercial implementations, a ranking method is sometimes desirable.

Assume two words have been typed in a document and a third word is being entered. Assume further that the co-occurrence score of each prior word with possible completions based on the characters already entered is available from the co-occurrence matrix. Then the "relationship score" is defined as a monotonic function of these co-occurrence scores—for example, a simple sum of the co-occurrence scores of candidate completions with the prior words.

---

Next, a function "f" is defined and stands for the "overall" score as follows:
    f=Overall score=if relationship score>1
    and if frequency score>1
    then overall score=relationship score times frequency score
    else overall score=relationship score+frequency score

---

Here, for example, relationship score=the sum of the co-occurrence scores of the candidate completions for the word being entered with the prior words in the text. Optionally, In some implementations, a limited part of the context will be used to make the computations practical, e.g. the prior ten words may be used.

Given the example above, if the two words of the document have already been typed, and a third word is being entered, in general, there will be several candidate completions. If one presumes that the candidate completion is some word "x", then the co-occurrence matrix is examined for the entry corresponding to x to find the co-occurrence score for "x" with the first two words of the message. In this example, presume that the scores are respectively 8 and 3. Thus, the relationship score will be 8+3=11. Of course, in this example, the complete number of words can be used. However, with longer documents, it may be desirable as noted above, to limit the number to some subset, for example, ten words in one example implementation.

Depending upon the particular implementation, the frequency score will, for example, be given by the number of times a word has been used by a user in all the documents on the device. Alternatively, in some implementations, a standard frequency of the word, for example as obtained from a corpus or standard usage, can be used instead of the user's own document-derived frequency. In yet other implementations, a function of the two types of frequency, the user based frequency and the corpus based frequency (e.g. the sum of the two) can also be used.

Then ranking is done, for example, by ordering according to increasing or decreasing overall score or by increasing or decreasing values of "f".

In some cases, two or more candidate completions can have a tie in their overall scores. In such cases, one of many ways to deal with this tie circumstance can be to order the completions by the following ranking hierarchy: exact match>stop word>related word>unrelated word, where "exact match" means the length of the completion=length of characters entered so far; "related word" means word with non-zero co-occurrence score; and "unrelated word" means word with a co-occurrence score of 0.

Of course, it will be appreciated that such a function will have multiple possible variants, only one of which has been described for concreteness, others being straightforwardly obtainable from an understanding of the prior example. Similarly, other ranking schemes can be used that are based on such a function.

A few such variants are now described. First, as mentioned above, any monotonic function (like a sum) of the co-occurrence scores may be used to arrive at a relationship score. Similarly, any monotonic function of the relationship score and frequency score may be used (like the combination of product and sum used to define f above) to arrive at an overall score. Finally, when there is tie, alternative rankings of candidate completions are possible on the basis of the cases described above (e.g. exact match, stopword, related word, unrelated word etc.) and other similar cases.

More general computational schemes may also be employed. For example, the functions described above need not be monotionic, although the results with such general functions may have limited practical value. Finally, a single function instead of two separate functions may also be considered, taking as arguments the co-occurrence scores of prior words and the various types of frequency scores described.

The ranking methods described above pertain to the co-occurrence method of computing associations between words. When the vector space and document grouping method is considered, a similar principle can be applied. Instead of the relationship score being a function of co-occurrence scores, the relationship score can be defined as some suitable function of the candidate completion's group membership: does it belong to multiple groups?, what is its frequency within each group?, and even some function of its various frequencies in multiple groups are the kinds of inputs that may be considered.

In addition to the contextual and automatic aspects which have been illustrated so far, there is also an optional dynamic aspect that can be included. Where such an aspect is used, the user continues to create more documents of different types, the system re-computes the associations of words for example, through the methods described above. This allows the system to keep evolving and improving as it has more and or new data to work with. In the case where a co-occurrence matrix is created by pooling all of the unique words from all of the pertinent documents, the option of updating the co-occurrence matrix in real time, even as the user is creating a new document, is available.

Notably, the above examples have implicitly dealt with unstructured documents (like emails, SMS text messages, word processed documents, etc.) and not with structured documents like forms, letters and spreadsheets. Advantageously, such documents can also be included in the class of documents useable with the invention. Moreover, the structure itself can additionally provide usable contextual clues. For example, in a letter, the closing usually contains words like "Very Truly Yours" or "Sincerely;" in such a situation, as a special case related to that used in the prior art, the system could suggest special words like "sincerely" from a special list because of the location in the document. Similarly, certain words may always appear capitalized (e.g. like the user's name and address) and these special words can once again be handled in a special way. In some implementations the word lists themselves can be further extended so as to contain, as needed or desired, a separate field for storing special information about the word such as capitalization, formatting (bold, italics, etc.), hyphenation, inclusion of special characters, accents on certain characters etc. Since the storing of such information, per se, is known and in use in, for example, certain word processors and it is readily implementable based upon that knowledge, for brevity it is not described herein.

As to treatment of numbers, in any given document there may be special numbers like the current date and year that can be offered as completions in the context of a letter or such numbers can be treated as "stop words."

Advantageously the above techniques can further be extended to allow for phrase completion. One way of doing this is to find phrases and so-called collocations by using standard frequency-based techniques on a phrase, as opposed to a word basis and then apply the methods described above to these phrases. In addition, an advantage of the techniques disclosed herein is that they can be combined with existing prior art techniques like Most Recently Used (e.g. "MRU") techniques. For example, one way to use a combination of the present invention and the prior art techniques is to narrow down the possible suggestion list using one of the above methods and then choose one or rank the remainder by an MRU technique. Another is to use regular dictionaries in the absence of any suggestion the system might make. Finally, the order of words on a word list generated by the vector space method can be allowed to change dynamically based on the use the user makes of suggestions he receives.

Note that when a user acquires a device like a computer, cell phone or personal digital assistant for the first time, there are not going to be any user-created documents on the device to which the methods described above can be applied. To allow for this, until there is some history of document creation, one or more of several options exist. One of the conventional prior art techniques could be used until a sufficient number of documents exist. Alternatively, manually created word lists or co-occurrence matrices of a generic type, i.e. that a multiplicity of users are likely to find useful, could be used; or more specialized word lists based on different types of vocabularies or uses (e.g. for bankers, lawyers, businessmen, doctors, domestic uses etc.) could be created by the provider or others. In general, such approaches would be temporary until the user has his or her own document-based history at which point the existing lists or co-occurrence matrices can either be augmented, modified or completely dropped in favor of new word lists and matrices generated by the user's own documents. These same approaches can also be used in the situation where there are documents on the device but the user is starting a new document and there are insufficient words entered to establish associations.

An optional extension of the methods which uses the text being generated as dynamic data will now be described. This method can be used, in some implementations, to augment any of the approaches described above.

Consider a user who is typing a somewhat long document (for example, more than three paragraphs, although this is again a variable parameter that can differ in particular implementations). Suppose they have already typed a few pages (say two pages) and now they are on the third page. The data entered so far can be used in any of two ways. One, as described above, where it provides the context to the next word being typed. Another, as dynamic data, in which the first two pages are used as data from which to create an auxiliary co-occurrence matrix of the type discussed above dynamically (i.e. "on the fly"). This matrix can then be used, as before in conjunction with either the word lists based on document groups of the first method described above or with the co-occurrence matrix of the second method described above. This approach can provide additional advantages because text in the document the user is currently working on will likely be more relevant to the word completions that can be offered to the user than those in the lists. This dynamically created matrix of co-occurrences is either continually updated on the fly, or periodically as the user continues to type—for example after each paragraph or page is completed. Alternatively, instead of using a co-occurrence matrix, a plain frequency matrix containing the number of occurrences of each word in the document being typed could be used.

In instances where it is desirable that the results derived from this dynamically-created data be combined with results derived from the offline data, the intersection of the results can be taken and further, it can be optionally ranked in some way. Alternatively or in case of an empty intersection, the union can be taken or one set of results given greater priority.

When a full keyboard is not available on the device (say a cell phone) there are currently methods (e.g. T9) which allow the user to enter, for example, the numbers 7 and 8 which correspond to the multiple groups of letters p, q, r, s and t, u, v respectively. A method like T9 offers the user an alphabetically ranked list of acceptable combinations (e.g. "pu" and "su" are acceptable, "pt" is not) based on dictionary entries. In such a situation, the computations described in the foregoing example involving any of the possible approaches would still occur, but not just to, for example, "su" but also to, for example, "pu." Presumably, if the user were typing something like "finance st/pu" then, just as completions like "sugar" would not be acceptable, completions like "pushing" would also not be acceptable under the same logic. If it turned out that that completion was, in fact, relevant under any of the methods above then multiple possible completions would be offered and these would be dealt with as before (e.g. by a ranked list).

Now an entirely different alternative approach to automatic dynamic contextual data entry completion is described which is similar in certain respects to the approaches described above with respect to the devices in which it can be embodied and the optional ability to use aspects described above.

In general, with this alternative approach, a variety of scores based on the occurrence of words, as defined herein, can be computed for candidate completions. Depending upon the particular implementation, such occurrences can be computed from words occurring in documents internal to the data entry system, documents obtained from, or contained in, one or more external corpora, or some combination thereof. So scores based on occurrences in internal and/or external documents can be considered as desired. Again, depending upon the particular implementation, the relevant scores can be, for example but are not limited to, bigram counts, proximity counts, frequency or unigram counts, even n-gram counts for $n>2$, and so on. Some representative calculations of these are given below. For purposes of explanatory example however, assume that a set of scores is already available for a universe of words contained in some set of documents (irrespective of source). This set of types of scores for each relevant word is arranged for consideration in some sequential way. For example, bigram score types based on internal data may be first in the sequence; next may be bigram score types based on external data; after that may be proximity score types based on internal data and then proximity score types based on external data; last may come unigram or frequency score types based on internal data followed by frequency score types based on external data. This creates an ordering of six types of scores. This arrangement of score type consideration creates what is called herein a "lex ordering." Note, the particular lex ordering can be selected for the particular implementation and need not correspond to the foregoing, nor does it need to have the same number of types of scores, which may be more or less, but will generally include at least three different types of scores. The general idea and important aspect is not the way specific score type values are calculated, the particular score types used, or the number of score types. Rather, the important aspects are (i) that each word that can be a candidate to complete the user input has at least one associated score type, (ii) each score type has an associated value that can be compared to the value of the same score type for another candidate to complete the user input, and (iii) the relationship of the score type values to each other, considered according to the specified sequence (i.e. the lex ordering), will be used to determine which of the candidates is provided to the user ahead of, or instead of, some other candidate(s).

In other words, once a user of the character entry system begins their input, this will result in the identification of some universe of potential "candidate completions" which will have associated score types and score type values which can be analyzed, as described below, to predict the remainder of the word being entered or, in implementations where it is used on a word basis, to predict the next word(s) based upon word(s) already entered. The process by which the candidate completions are selected for presentation using the score types and their values will now be discussed.

In general, the candidate completions are ordered by a process which will be referred to herein as a Generalized Lexicographic Ordering (GLO).

Consider, by way of example, two candidate completions $c1$ and $c2$. The process of selection proceeds as follows. First, each candidate completion's first score type and its associated value (as identified by the lex ordering (e.g. a bigram score based on internal data)) are obtained. Next, the absolute difference between the values of that score type for the two candidates $c1$, $c2$ is calculated. If this absolute difference is "large" (i.e. it is greater than or, optionally, is greater than or equal to) some pre-specified threshold value T1 which may vary from language to language or implementation to implementation, then the candidate completion with the greater of this score type value is ordered ahead of the one with the lesser value of that score type; if the absolute difference is "small" (i.e. less than or, optionally, less than or equal to) the threshold T1, then the next score type in the lex ordering is used and, again, a comparison is made of the absolute difference between the values of that next score type for both candidate completions with respect to some new threshold T2 which may or may not be the same as T1. Again, if this second absolute difference exceeds (or optionally is greater than or equal to) T2, then the candidate completion with the higher value for this second score type is ordered ahead of the other candidate completion; similarly, if the absolute difference does not exceed (or optionally exceed or equal) T2, then the process is yet again repeated using the third score type for the candidate completions according to the lex ordering and the absolute value of the difference between this next score type values is compared to a threshold with the result determining whether one of the candidate completions can be ordered ahead of the other or if the process must continue with yet another score type, until either the two candidate completions can be ordered one ahead of the other or the last score type in the lex ordering has been reached. If the last score type has been reached and the last absolute difference in the score type values is less than the last threshold, depending upon the particular implementation, the two candidates can be considered equivalent, and one can be presented ahead of the other on some other basis, either can be presented to the user before the other, or both can be concurrently presented. This comparative and generalized lexicographic ordering is executed for all candidate completions and then, depending upon the particular implementation, the first n candidates in the resulting sequence can be presented to the user.

FIGS. 7 through 10 illustrate, in simplified form, various steps involved with aspects of this alternative approach.

Specifically, FIG. 7 illustrates, in simplified form, an aspect of the alternative approach whereby the initial system is set up. The process begins by creating a list of unique words from at least one corpus of documents (Step 702). As noted above, a corpus can be wholly internal to the system, wholly external to the system or some combination of one or more internal and external corpora. Optionally, if desired, stop words and/or other words which are to excluded for some reason can be discarded from the list or ignored in creating the list (Step 704). Next, for each unique word in the list, the relevant counts are obtained for the different score types to be used in the lex ordering analysis (for example, bigram, proximity, frequency, unigram, n-gram or other type) (Step 706). Then, matrices (or, alternatively, other data structures) are constructed for each score type and populated with the scores for later retrieval and use (Step 708). Depending upon the particular implementation, the counts can be used directly as scores or, as shown, can optionally be converted to scores by a normalization process so that they are represented, for example, as ratios, percentages or some other usable fashion (Step 710). Of course it should be recognized and understood that, in may respects, Steps 702 through 710 could also be performed as one step or in different order, for example, the normalization could be performed as part of step 706 and prior to constructing the data structures, or the data structure construction could occur as part of creation of the list in step 702.

Returning to the process, once the data structures are created and populated, prior to use, they will be stored in processor accessible storage for use (Step 712). Again, this could be a separate step or could occur concurrently with one or more of the prior steps 702 through 712.

FIG. 8 illustrates, in simplified form, another aspect of the alternative approach. As shown, the process involves establishing a lex ordering involving one or more of the available score types (Step 802). Then a threshold is established for each score type which will be used (Step 804). Again, depending upon the particular implementation, the threshold(s) can be the same among score types or can be different for each. Similarly, depending upon the particular implementation, steps 802 and 804 can occur in reverse order or can occur in a partial or wholly overlapping manner.

Figure 9:
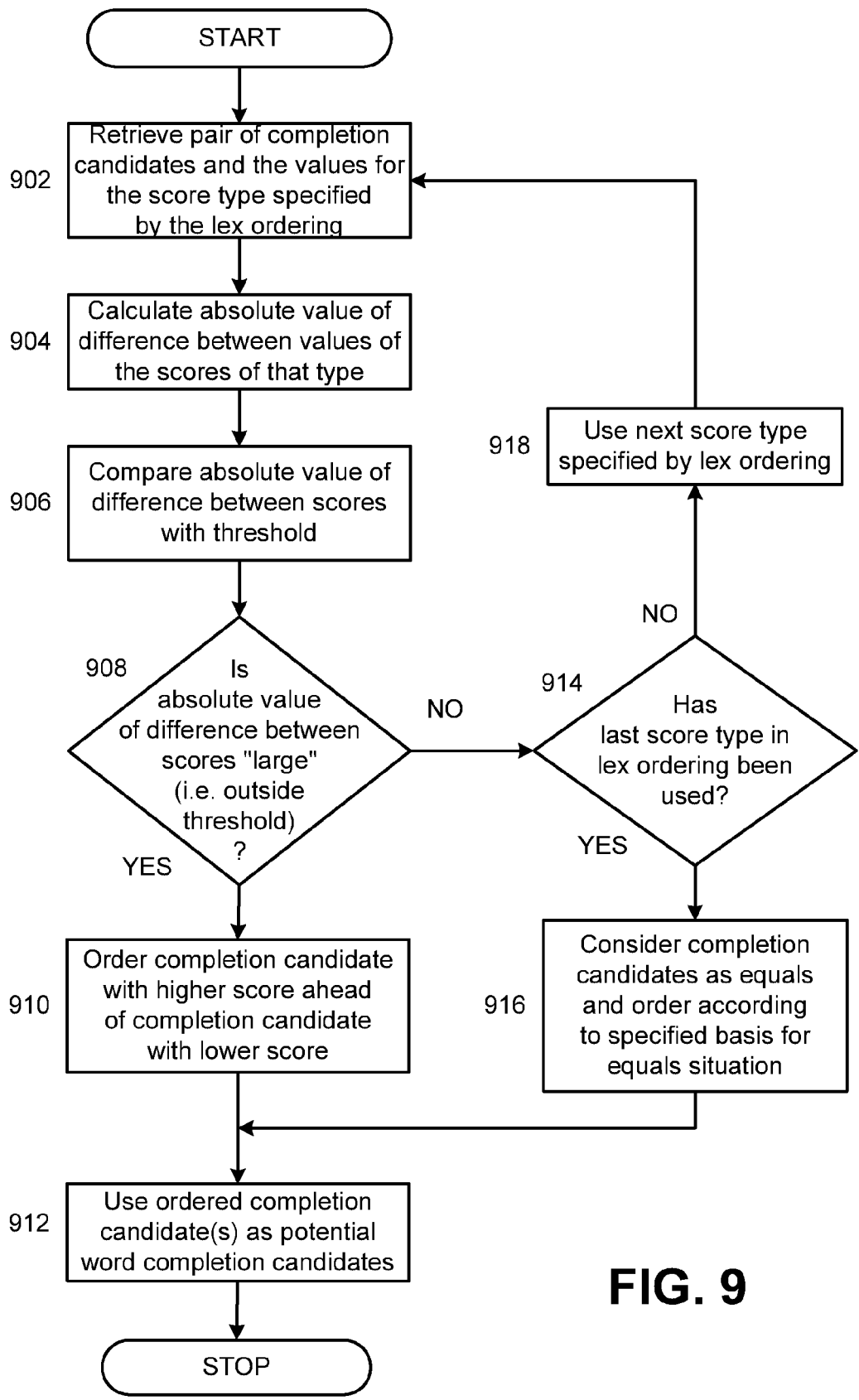
FIG. 9 illustrates, in simplified form, a flowchart of a general version of the GLO process.

The GLO process can be shown and described, in its most general, by way of the flowchart of FIG. 9. With the GLO process of FIG. 9, it is presumed that a user has entered at least one character and, as a result, a subset from the list of unique words can be selected as candidate completions (for purposes of this example, two words) and it is also presumed that each candidate completion has an associated set of at least one, and more likely at least two different score types, and each candidate completion has an associated value for each score type. The process thus begins by retrieving for a pair of completion candidates, their scores for the score type specified according to the current place in the lex ordering (Step 902). Next, the absolute value of the difference between the values (Step 904). The calculated absolute value is then compared with the threshold (Step 906). If the absolute difference at the particular level of the lex ordering is "large" (Step 908), then the relevant candidate completions are ordered with the higher value of that score type ahead of the other (Step 910) and the ordered completion candidates can be used as potential word completion candidates (Step 912); otherwise, if the difference is not "large," the process checks whether all of the score types in the lex ordering have been used (Step 914). If all of the levels in the lex ordering (all score types) have been exhausted and, at the last level there is a "tie" because the absolute value of the difference is not sufficiently large, then the candidate completions are ordered on some other basis (Step 916), at which point they can be used as potential word completion candidates (Step 912).

Alternatively, if the last score type in the lex ordering has not yet been used, the process goes to the next level in the lex ordering (Step 918) and repeats for that next score type (Step 902).

Note that, depending upon the particular implementation, the absolute values of the differences can be computed sequentially for each score type as needed or they can all be computed concurrently. Of course, in the latter case, it is possible that some of those computations may not be used. For example, if (analyzed according to the lex ordering) the absolute value of the third and further score type value differences may not be used if the absolute value of the first score type value difference is "large" or, thereafter, if the absolute value of the second score type value difference is "large."

Optionally, and advantageously, the foregoing process may be augmented with a parallel spelling correction algorithm. When augmented in this way, if the candidates produced by the GLO are, say, a, b, c (in that order) and if a parallel spelling correction procedure yields x, y, z as its ordered candidates, then all the candidates are together ordered as a, b, c, x, y, z, that is, in most instances, the GLO candidates are presented before the spelling correction candidates. Of course, in some implementations, it may be desirable to order the spelling correction candidates ahead of the GLO candidates. Alternatively, it may be desirable to analyze the spelling correction candidates according to the GLO approach described above before presentation and present them as determined by the GLO approach.

N-gram scores are well known and defined in standard texts such as, for example, Chris Manning & Hinrich Schütze, Foundations of Statistical Natural Language Processing, MIT Press, Cambridge, Mass. (May 1999), so they need not be defined here. As used herein, a "proximity score" is defined as the count of number of co-occurrences of the second-last word and the current word being typed. So, in a sentence like "How are you?" if "How are y" has been entered, then the proximity score would be computed by the co-occurrence count of "How," the second-last word, with, say, "you" and "your" with respect to internal data and external data giving two internal proximity scores and two external proximity scores. Moreover, depending upon the particular case, there are two different ways of doing the counting, one being unidirectional (e.g. just "how" followed by "you" in that order) and the other being bi-directional (e.g. "how" with "you" in either order).

Advantageously, the GLO method, can be used with any set of score types, whether just one type or multiple types. The lex ordering can be defined in advance or may change dynamically as the system progresses or based upon some triggering event(s). Moreover, depending upon the particular implementation, the relevant values for the types of score for each candidate can be computed in advance (in whole or part), all at once or dynamically as needed. Still further, the values of the score types can be specified either as counts or as corresponding probabilities, because the process is indifferent to which numerical measure is used. In addition, the various thresholds to which the absolute value of a difference between score type values is compared can be static or dynamic, can be different or the same for different levels in the lex ordering, and/or can vary with the language(s) with which the GLO process is used. The threshold values $T_n$ can also be implemented as percentages, in which case the absolute value of the differences would also be measured as percentages in some standard way. Also, when several candidates need to be compared, either they can all be analyzed according to the GLO approach or only the top n (based upon some other measure) can be so analyzed. These choices are details which will vary among implementations and are subordinate to the GLO approach itself.

Now, for purposes of further understanding the GLO process, a specific example will now be provided. For simplicity, the lex ordering cited above is again used in this example and presume that the words come from both internal and external corpora such that the lex ordering to be used in this example is: internal bigram>external bigram>internal proximity>external proximity>internal unigram or frequency>external unigram or frequency. Note here that, "internal" means internal to the storage of the character entry system and "external" means external to the character entry system such that "internal bigram" means bigram scores obtained from purely the internal corpus, whereas "external bigram" means bigram scores obtained from purely the external corpus. Consider the example sentence beginning input by a user: "How are y" where the first letter of the next word "y" has been entered and that word has to be completed. Suppose that, based upon the particular corpora there are three candidate completions based upon the input of the "y" so far: you, your, young. Then presume that the values of the internal bigram score type for "you" and "your" are respectively, 6 and 5, and the value of the internal bigram score for "young" is 1. Moreover, presume that the first threshold T1 for this example is T1=2.

Applying the GLO process to these candidates yields absolute differences as between "you" and "young" of 5 (i.e. |6−1|=5), and between "your" and "young" of 4 (i.e. |5−1|=4). Thus, based upon the threshold T1=2 in this example, both "you" and "your" would be placed ahead of "young" in the presentation sequence. However, as between candidates "you" and "your", the absolute difference between their score type values would only be 1 (i.e. |6−5|=1) which is less than the threshold of T1=2. As a result, as between these two candidates, the next level of the lex ordering must be used, i.e., the values of the difference between the external bigram type scores for those two candidates must be compared relative to the threshold for that level (i.e. T2). If that yields a sufficient difference, then whichever of "you" and "your" has a higher value for its external bigram type score would be presented ahead of the other. If not, then the third type of scores is used, and so forth, until eventually a complete ordering among these three candidates is produced by going through the levels of the lex ordering or the use of the last score type in the lex ordering is used and a tie (i.e. an insufficient difference relative to the final threshold) results, in which case some other criterion can be used to determine which one should be placed ahead of the other.

Based upon the foregoing, FIG. 10 illustrates, in simplified form how the GLO process is used for word completion in a character entry system.

In this regard, presume that the character entry system is being used such that the user begins the relevant input. The character entry system receives the input (Step 1000) and, begins to identify completion candidates based upon that input (Step 1002). As this is happening, the GLO process is applied (for example as described in connection with FIG. 9) to those completion candidates identified to order the completion candidates and thereby determine which completion candidates are to be presented to the user (i.e. presentable potential word completion candidate(s)) (Step 1004).

The presentable potential word completion candidate(s) are then presented to the user for selection (Step 1006). At this point, there are essentially two possibilities. Either, the user selects one of the presented potential word completion candidates or they continue to input until the word is complete (Step 1008). If the user selects a presented potential word completion candidate, the word is completed using that selected candidate (Step 1010). In addition, optionally, the fact of the user's selection can be used to modify one or more score values in the matrices (Step 1016). If the user does not select any candidate, the system obtains the user input word (Step 1012) and determines whether that word is already in a corpus from which the completion candidates were identified (Step 1014) and, if it is, optionally, score values for that word can be re-analyzed and modified in the matrices if necessary (Step 1016) and, if it is not, the user input word can be added to a corpus and analyzed for integration into the matrices for later use with the system (Step 1018). Note that, in the former case, the reason might simply reflect user preference at that moment for simply typing the word (irrespective of whether it was presented as a completion candidate) or may reflect a word that is in a corpus, but was excluded (for example, as a stop word or for some other reason). The latter case, may also reflect a stop word or excluded word condition or it may arise because that word did not previously appear in any corpus in use. In any of the foregoing cases, advantageously, this approach allows a system to "learn" new words or determine at some point that a stop word or previously excluded word should thereafter be included as a possible completion candidate.

Finally, it should also now be appreciated that the GLO process can also be used to predict the next word in a sentence or phrase even when no letters have been entered by using upon one or more of the previous words entered and, in some cases where editing of an existing set of words is occurring. Depending upon the particular implementation, using the GLO process one or more words that follow an input word may alternatively or additionally be provided for selection as well. In such a case, this should also be considered "word completion" as used herein because the same basic process would be used, with the selection of the candidates being based upon, for example, bigrams (internal or external) formed between words in the corpora with the previous and/or next word(s), or the proximity score values of other words with within some number of words (i.e. the proximity) of another word which may be the next word to be typed. In addition, one could take the union of unigram counts and bigram counts. In any event, a key advantage of some implementations of the GLO approach is this ability to provide the next word for selection by a user as opposed to, or in addition to, the word that would complete the specific character string being entered.

Finally, it is to be understood that various different variants of the invention, including representative embodiments and extensions have been presented to assist in understanding the invention. It should be understood that such implementations are not to be considered limitations on either the invention or equivalents except to the extent they are expressly in the claims. It should therefore be understood that, for the convenience of the reader, the above description has only focused on a representative sample of all possible embodiments, a sample that teaches the principles of the invention. The description has not attempted to exhaustively enumerate all possible permutations, combinations or variations of the invention, since others will necessarily arise out of the use of particular hardware or software or through specific types of applications in which the invention can be used. That alternate embodiments may not have been presented for a specific portion of the invention, or that further undescribed alternate embodiments may be available for a portion of the invention, is not to be considered a disclaimer of those alternate embodiments to the extent those undescribed embodiments also incorporate the minimum essential aspects of the invention, as claimed, or an equivalent thereof.

What is claimed is:

1. A method performed in a computer device having associated therewith a plurality of unstructured documents having words therein, the computing device also having associated therewith a way for a user of the computer device to provide input of at least components of words, the computing device comprising at least one processor, the method comprising:
   receiving in the computer device as an input, at least one component of a word;
   based upon the input, accessing using the computing device, at least one stored matrix accessible to the computer device, the at least one stored matrix containing words from the unstructured documents and, for each word, a value for at least one score type;
   retrieving from the at least one stored matrix at least two words as potential completion candidates and each's associated value for the at least one score type;
   based upon a lex ordering, specifying an order in which values of score types are to be analyzed;
   analyzing, using the computer device, the potential completion candidates by calculating an absolute value of the difference between the values of the potential completion candidates for a first score type specified by the lex ordering and comparing the absolute value of the difference to a threshold;
   when the threshold is met, ordering the potential completion candidates, using the computer device, such that the potential completion candidate with the greater value for the first score type is ahead of the potential completion candidate with the lesser value for the first score type; and
   presenting at least the one of the potential completion candidates that was placed ahead, to the user using the computer device, in response to the input such that the user can select the presented at least the one of the potential completion candidates to complete the user's input.

2. The method of claim 1, wherein the at least one score type comprises at least the first score type and a second score type, and wherein the threshold is a first threshold, and wherein when the first threshold is not met, the method comprises:
   analyzing, using the computer device, the potential completion candidates by calculating an absolute value of the difference between the values of the potential completion candidates for the second score type specified by the lex ordering and comparing the absolute value of the difference to a second threshold; and
   when the second threshold is met, ordering the potential completion candidates such that the potential completion candidate with the greater value for the second score type is ahead of the potential completion candidate with the lesser value for the second score type.

3. The method of claim 2, wherein the first threshold and the second threshold are different.

4. The method of claim 2, wherein the first threshold and the second threshold are equal to each other.

5. The method of claim 1, wherein the first score type is one of:
   a bigram score type, a proximity score type, a unigram score type, or a frequency score type.

6. The method of claim 5, wherein the first score type is based on one of:
   internal document content data, external document content data, or a combination of internal and external document content data.

7. The method of claim 1, wherein the at least one score type comprises at least two score types and wherein the lex ordering specifies a score type analysis order for the at least two score types.

8. The method of claim 7 wherein each word has associated with it a value for each of the at least two score types.

9. The method of claim 7 wherein the first score type is one of at least two score types that are different from each other based upon whether data on which they are based is internal document content data or external document content data.

10. The method of claim 1, further comprising:
    receiving, via the computer device, a selection by the user of one of the presented potential completion candidates as the user's desired word and modifying at least one score value for the desired word in the at least one stored matrix.

11. A method performed in a computerized character entry system, the method comprising:
    receiving an input into the computerized character entry system from a user;
    identifying, using a processor of the computerized character entry system, at least two completion candidates from at least one matrix based upon the user input, each of the at least two completion candidates having an associated value for each of at lest two score types;
    performing, using the processor of the computerized character entry system, a Generalized Lexicographic Ordering (GLO) process on the two completion candidates based upon the score types and an analysis of values for the score types according to a specified lex ordering, so as to obtain a presentation order for the at least two completion candidates;
    based upon the presentation order, presenting, using the processor of the computerized character entry system, at least one of the completion candidates to the user for selection; and
    if the user selects a specific completion candidate as a result of the presenting, completing the user's input using the specific completion candidate.

12. The method of claim 11, wherein the analysis of values comprises:
    taking an absolute value of the difference between a value of a particular score type associated with one of the at least two completion candidates and a value of the particular score type associated with an other of the at least two completion candidates; and
    comparing the absolute value of the difference to a specified threshold.

13. The method of claim 12, wherein the analysis of values further comprises:
    determining that a result of the comparing is large and, based upon the determining, ordering the at least two completion candidates such that whichever of the at least two completion candidates had the value of the particular score type which was higher is ordered ahead of the other in an ordering of the at least two completion candidates.

14. The method of claim 12, wherein the analysis of values further comprises:

determining that a result of the comparing is small and, based upon the determining, according to the lex ordering, taking an absolute value of the difference between a value of an other score type associated with one of the at least two completion candidates and a value of the other score type associated with an other of the at least two completion candidates.

15. The method of claim 11 wherein, if the user does not select a specific completion candidate as a result of the presenting, the method comprises:

obtaining the user's input word and determining, using the processor of the computerized character entry system, whether the word is part of any matrix or corpora from which the at least two completion candidates were identified.

16. The method of claim 15, wherein, when a result of the determining whether the word is part of any matrix or corpora from which the at least two completion candidates were identified is that the word was not, the method comprises:

integrating the word and a corresponding score for each score type identified in the lex ordering for the word into at least one matrix stored for use by the computerized character entry system.

17. The method of claim 11, wherein the specified lex ordering specifies at least one score type selected from among: a bigram score type, a proximity score type, a unigram score type, or a frequency score type.

18. The method of claim 17, wherein the at least one score type is based on one of:

internal document content data, external document content data, or a combination of internal and external document content data.

* * * * *